Oct. 27, 1953 A. W. ZIEGLER 2,657,320

PIEZOELECTRIC CRYSTAL UNIT

Filed Dec. 30, 1948

INVENTOR
A. W. ZIEGLER
BY
M. R. McKenney
ATTORNEY

Patented Oct. 27, 1953 2,657,320

UNITED STATES PATENT OFFICE 2,657,320

PIEZOELECTRIC CRYSTAL UNIT

Arthur W. Ziegler, Short Hills, N. J., assignor to Bell Telephone Laboratories, Incorporated, New York, N. Y., a corporation of New York Application December 30, 1948, Serial No. 68,222

13 Claims. (Cl. 310—9.7)

This invention relates to wire equipped crystals and more particulraly to wire equipped crystals in which the wire extends into contact with the crystal.

The invention is applicable to crystals in which wires are provided as electrical connecting means for the crystal.

An object of the invention is to provide an improved crystal device in which an end portion of a wire is directly secured in the crystal.

A feature of the invention resides in the connection joining the wire and the crystal.

Another feature resides in the method of securing the wire to the crystal.

Crystals having piezoelectric properties are often required to be equipped with wires to provide a crystal element suitable for use in an electrical system. The wires provide electrical leads for the crystal and also serve as means for supporting the crystal while still allowing the crystal to vibrate in performing its required function. In some cases the crystal is plate like in form and each wire is so secured to the crystal that the wire extends angularly outward from a surface of the crystal. Since the crystal moves in performing its required electrical function it is a desideratum that any mechanical loading of the crystal by the wire be reduced to a minimum.

In the present invention an end portion of a wire extends into a crystal and is imbedded in the crystal.

Crystals required to be equipped with wires are sometimes made of material that can be penetrated by a wire when the point of engagement of the wire and the crystal is subjected to a required relatively high temperature. Rochelle salt crystals and other water soluble crystals, for instance, can be penetrated by a sufficiently heated wire. I have found by actual experiment that a crystal made of ethylene diamine tartrate can be readily penetrated by a relatively hot wire.

Although I have mentioned water soluble crystals and crystals made of ethylene diamine tartrate as suitable for use in practicing the invention, I believe it is also in the realm of possibility to have the crystals made of other materials.

Figure 1:
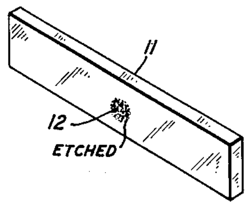
Fig. 1 is a view in perspective of a crystal a portion at least of which has been etched to prepare a surface of the crystal for securing a wire to the crystal.

Merely for the purpose of explaining the invention and not in the sense of a limitation thereof, it will be assumed that the crystal 11 shown in Fig. 1 is a plate-like crystal formed of ethylene diamine tartrate or other suitable material having piezoelectric properties. The crystal 11 is etched to provide an etched area 12 and into the center of which will be thrust an end portion 13 of a wire 14 shown in Fig. 8.

Figure 8:
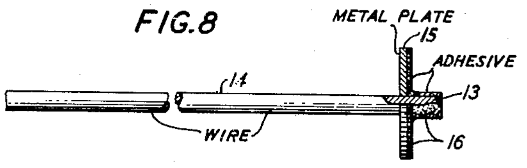
Fig. 8 shows an enlarged view of a wire equipped with a disc in preparation for securing the wire to a crystal.

The wire 14 as shown in Fig. 8 is equipped with a suitable apertured plate 15 and through which the wire 14 extends. In mounting the plate 15 on the wire 14, the plate 15 can be impaled on the wire 14 so that the plate 15 is force fitted on the wire 14 and will remain in the position shown in Fig. 8. The projecting end portion 13 of the wire 14 and the near flat surface of the plate 15 are coated with an adhesive 16 or other suitable material that will absorb stresses set up between the wire and a crystal under widely varying temperature conditions. A Durez-Hycar material is suitable for the adhesive coating 16. This material is composed of Hycar, which is a buna N rubber, Durez, which is a phenol formaldehyde resin, and acetone, the proportions being variable. It is to be understood, however, that some other material might be used without departing from the spirit of the invention. After the adhesive coating 16 is applied, the wire shown in Fig. 8 is placed in an oven to preset the adhesive coating 16. For example, if a Durez-Hycar material is used the coated wire would be baked for about ¼ hour at a temperature of about 130° C.

Figure 5:
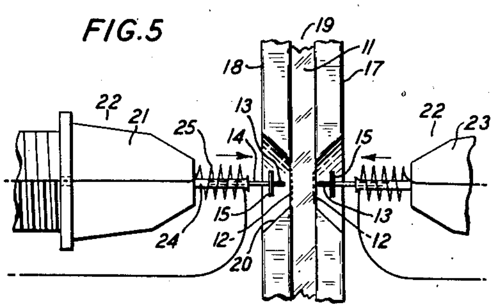
Fig. 5 shows a portion of a crystal and portions of an apparatus used in connecting wires to the crystal.

After the crystal 11 has been etched as shown in Fig. 1 and the wire 14 has been equipped with the plate 15 as shown in Fig. 8, the crystal 11 is placed as shown in Fig. 5 between spaced and apertured walls 17 and 18 of a jig 19 which can be heated to a required predetermined temperature to preheat the crystal 11. In register with an aperture 20 in the wall 18 is a movably supported head 21 of a wire holder device 22 equipped also with another movably supported head 23. The movably supported heads 21 and 23 can be moved toward or away from the crystal 11 as required and each movably supported head is equipped with a tubular needle 24 projecting endwise from and supported in the head 21 or 23. Each tubular needle 24 can be of a character somewhat similar to a so-called hypodermic needle and is constructed to receive within its bore a major portion of the wire 14. Surrounding the tubular needle 24 is an electrically energizable heating coil 25 which can be energized from a suitable source of electrical current supply (not shown). When the heating coil 25 is energized, the wire 14 is indirectly heated by way of the tubular needle 24. By heating the wire 14 to a required temperature and by thrusting the wire 14 endways against the crystal 11, the wire 14 can be made to in effect melt its way into the crystal 11.

During the thrusting of the heated wire 14 into the crystal 11, some of the material in the crystal 11 is melted and some of the adhesive on the wire end portion 13 is softened and combines with the softened crystal material and the combined material upon cooling sets up around the end portion 13 of the wire 14 and serves to secure the end portion 13 of the wire 14 in the crystal 11. Some of the melted crystal material while in a softened condition will also spread over the etched portion 12 of the crystal 11 and between the etched portion 12 of the crystal 11 and the inner surface of the plate 15. Some of the adhesive on the inner surface of the plate 15 is also softened by the heat applied and combines with the softened crystal material and the combined material upon cooling will form in effect a cement to bond the plate 15 to the etched portion 12 of the crystal 11. The softening of the adhesive on the end portion of the wire 14 and on the inner face of the plate 15 tends to reduce the thermal shock to the crystal 11 and considerably reduces the possibility of causing the crystal to fracture when the relatively high temperature is applied. When the plate 15 is secured to the crystal as above described, considerable mechanical stresses can be applied to the wire without destroying or impairing the connection formed between the plate and the crystal, the plate 15 and the cement connection formed between the plate and the crystal operating to considerably distribute and dissipate any mechanical stresses applied to the wire. If the adhesive material is a Durez-Hycar material the wire equipped crystal is subsequently baked at a temperature of about 133° C. for about one hour to finally cure the adhesive.

Figure 6:
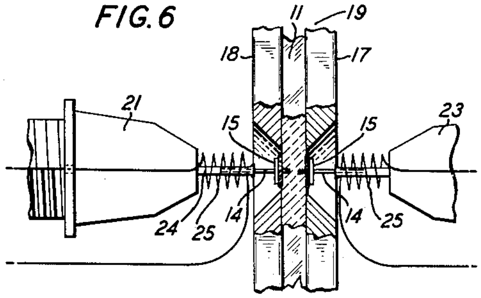
Fig. 6 shows a further step in connecting the wires to the crystal.

As shown in Fig. 6, two wires 14 have been attached to the crystal 11 in the above-described manner, one wire 14 extending from one side of the crystal 11 and the other wire 14 extending from another side of the crystal 11. After the wires 14 have been thrust into the crystal 11 as shown in Fig. 6, the heating coils 25 are deenergized and the heads 21 and 23 of the apparatus 22 are moved away from the crystal 11, the hollow needles 24 sliding off the wires 14 and leaving the wires 14 attached to the crystal 11 to provide as shown in Fig. 2 a lead wire 26 and a lead 27 for the crystal 11.

Figure 2:
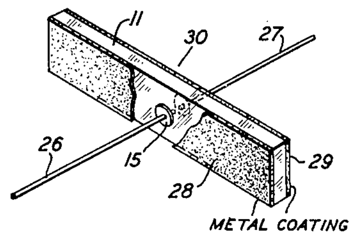
Fig. 2 shows a crystal with wires secured thereto in accordance with the invention and with metal coatings on the crystal, a portion of one metal coating being broken away to show parts of the wire connection.

After the crystal 11 has been equipped with the lead wires 26 and 27 as shown in Fig. 2, major flat surfaces of the crystal 11 and outer faces of the plates 15 are coated with metal to form electrodes on two opposite faces of the crystal 11. The metal coatings might be gold or other suitable metal applied as required such for instance as by evaporating the metal onto the crystal 11 and over the outer faces of the plates 15. It will be seen as shown in Fig. 9, that one metal coating 28 extends over one face of the crystal 11 and over the outer face of the plate 15 on the lead wire 26 and that the other metal coating 29 is located on an opposite face of the crystal 11 from the position of the metal coating 28 and extends over the outer face of the plate 15 on the lead wire 27.

Figures 9, 10:
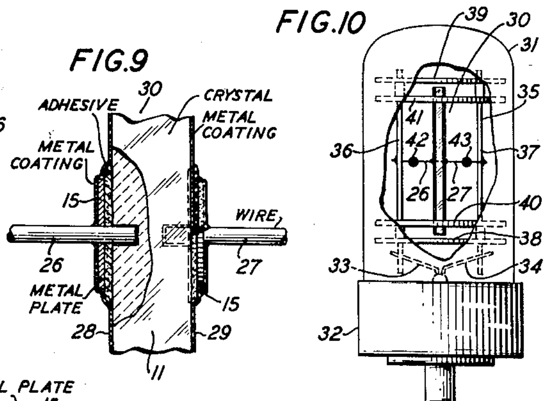
Fig. 9 is an enlarged view, partly in section, of a portion of a crystal with wires connected to the crystal according to the invention.
Fig. 10 shows the crystal mounted in a protective casing of conventional form and structure.

The crystal element 30 illustrated in Figs. 2 and 9 can be mounted as shown in Fig. 10 in a protective casing 31 having a base 32 through which conductors 33 and 34 extend to a frame 35 enclosed in the protective casing 31. The frame 35 comprises conducting bars 36 and 37 supported in spaced relation by apertured insulating plates 38 and 39. Apertured bumper plates 40 and 41 are also included in the frame structure 35 and the lead wires 26 and 27 of the crystal element 30 are solder connected to the respective conducting bars 36 and 37 which are in electrical connection with the respective conductors 33 and 34. The lead wires 26 and 27 form the only means of connection between the crystal element 30 and the frame 35 thus allowing the crystal part of the crystal element 30 to vibrate rather freely when the crystal element 30 is in electrical operation. Each lead wire 26 and 27 is weighted with a ball of solder or other suitable material, the lead wire 26 having a ball 42 and the lead wire 27 having a ball 43, the weighting of the lead wires 26 and 27 being such that vibrations of the crystal are not transmitted to the frame 35 and the crystal element 30 is not unduly affected by vibrations coming from outside and through the frame 35 by way of the conducting bars 36 and 37.

Figure 3:
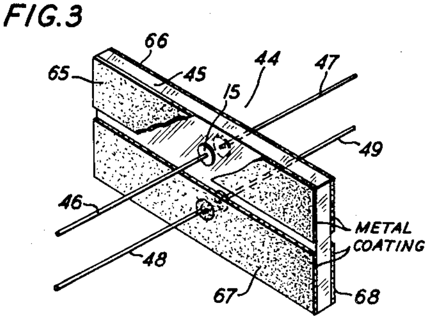
Fig. 3 shows a crystal with four wires connected thereto in accordance with the invention.
Figure 4:
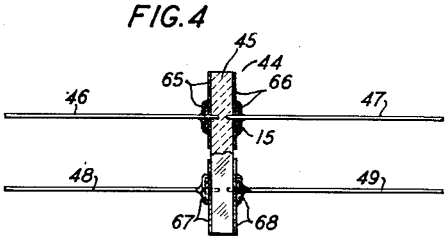
Fig. 4 is an edge view of the crystal shown in Fig. 3 and partly in section.
Figure 7:
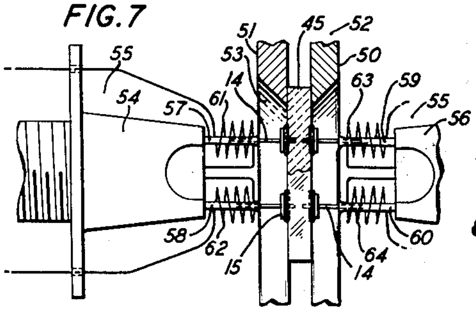
Fig. 7 shows a modification of the apparatus and operable to simultaneously connect four wires to a crystal of the type shown in Fig. 3.

Figs. 3 and 4 show a crystal element 44 of the general form of the crystal element 30 shown in Fig. 2 but with four wires secured to the crystal. The crystal element 44 comprises a crystal 45 equipped with lead wires 46, 47, 48 and 49 which are secured to the crystal 45 in the same manner as the lead wires 26 and 27 are secured to the crystal 11 shown in Figs. 2, 6 and 9. Each lead wire 46, 47, 48 and 49 follows the structure shown in Fig. 8. Fig. 7 shows a crystal 45 with the four lead wires thrust into the crystal 45 and secured to the crystal 45. In this case the apparatus used in equipping the crystal with the lead wires comprises spaced and apertured walls 50 and 51 of a jig 52 which can be heated to a required predetermined temperature to preheat the crystal 45. In register with an aperture 53 in the wall 51 is a movably supported head 54 of a wire holder device 55 equipped also with another movably supported head 56. The movably supported heads 54 and 56 can be moved toward or away from the crystal 45 as required and each head carries two tubular needles, each of which follows the structure of the needle 24 shown in Figs. 5 and 6. For example, the head 54 carries the hollow needles 57 and 58 and the head 56 carries the hollow needles 59 and 60. Heating coils 61, 62, 63 and 64 are provided to heat the respective hollow needles 57, 58, 59 and 60.

As shown in Fig. 7, a wire 14 equipped as shown in Fig. 5 with a plate 15, is supported in each hollow needle 57, 58, 59 and 60. The heating coils 61, 62, 63 and 64 have been energized to heat the respective hollow needles 57, 58, 59 and 60 and raise the temperature of the wires supported in the hollow needles and the heads 54 and 56 have been moved to thrust the heated wires into the crystal 45. After the wires have been thrust into the crystal 45 the heating coils are deenergized and the heads 54 and 56 are moved away from the crystal 45 to leave the wires attached to the crystal 45 to form the lead wires 46, 47, 48 and 49 shown in Figs. 3 and 4. After the four wires have been attached to the crystal 45, the major flat surfaces of the crystal are coated with metal. As shown in Figs. 3 and 4 the metal coating 65 extends over a portion of the crystal 45 and over the outer surface of the plate 15 on the lead wire 46, the metal coating 66 extends over a portion of the crystal 45 and over the outer surface of the plate 15 on the lead wire 47, the metal coating 67 extends over a portion of the crystal 45 and over the outer surface of the plate 15 on the lead wire 48 and the metal coating 68 extends over a portion of the crystal 45 and over the outer surface of the plate 15 on the lead wire 49.

It has been found in the manufacture of piexoelectric crystal elements comprising a crystal and lead wires attached thereto and in cases in which a relatively high temperature is used in securing the wire in place or to a support that the crystal per se is sometimes subjected to such thermal shock that the crystal per se is fractured and thus rendered unfit for use, or that small particles of the crystal are broken away from the body of the crystal to such an extent that the crystal element does not have the precise required electrical value.

In my invention the wire forming a lead wire of a crystal element extends into the crystal and a metal plate supported on the wire is disposed against an outer face of the crystal. The end portion of the wire extending into the crystal and the face of the plate disposed adjacent the crystal are coated with an adhesive that protects the crystal per se from undue thermal shock when the wire is subjected to a relatively high temperature.

If the crystal is made of ethylene diamine tartrate, I preheat the etched crystal such for instance as shown in Fig. 1 to about 160° C., the crystal being clamped between the walls of the jig 19 shown in Figs. 5 and 6, the jig being heated at the same time as the crystal and to a temperature almost sufficient to melt the material of the crystal. While the jig 19 and the crystal are still heated, I place the jig and crystal in the wire holding device 22 in which the required wires constructed as shown in Fig. 8 are supported. If the wires are about ⅝ inch long and 8 mils in diameter and the plate is about 30 mils diameter and about 1 mil thick, I can heat the wire assemblies to a sufficient temperature to melt their way into the crystal by passing a current of about 6 amperes through the heating coils of the wire holding device 22 for about two seconds.

I have found that when the crystal is preheated to a required temperature, a plurality of heated wires can be simultaneously thrust into the heated crystal without subjecting the crystal to such thermal shock as would render the crystal unfit for required use.

Although the crystal has been shown and described as having an etched surface it has been found nunnecessary in some cases to etch the crystal and that the wires can be attached to the unetched crystal in accordance with the invention.

What is claimed is:

1. A crystal element comprising a crystal, a wire extending partway into said crystal and a plate secured to said wire and secured to said crystal.

2. A a crystal element comprising a crystal, a wire extending partway into said crystal and a plate impaled on said wire and cemented to said crystal.

3. A crystal element comprising a crystal, a wire extending partway into said crystal, a plate secured to said wire and to said crystal and a metal coating extending over a portion of said crystal and over said plate.

4. A crystal element comprising a crystal, an apertured plate disposed against the surface of said crystal, a wire extending through said plate and into said crystal and an adhesive material securing said wire and said apertured plate to said crystal.

5. A crystal element comprising a crystal of water soluble material and a wire extended into said crystal by melting its way into said crystal, said wire being secured in said crystal by materials displaced in the extending of said wire into said crystal.

6. A crystal element comprising a crystal of ethylene diamine tartrate material, a wire extending into said crystal and that has been heated and thrust in a heated condition into said crystal and an adhesive coated plate secured on said wire and disposed against said crystal, the adhesive coating on said palte having united with some of the material of said crystal to bond said plate to said crystal.

7. The method of securing a wire to a synthetic crystal comprising heating a wire and thrusting the wire into said crystal and utilizing the material displaced by the heated wire to serve as a cement to secure the wire in place in said crystal.

8. The method of securing a wire to a synthetic crystal comprising coating a wire with adhesive, heating the wire and thrusting the heated wire into said crystal and allowing material displaced by the heated wire to combine with the adhesive to secure the wire in place in the crystal.

9. The method of securing a wire to a synthetic crystal comprising securing a plate on the wire, coating an end portion of the wire and the plate with an adhesive, heating the wire and thrusting the adhesive coated end portion of the heated wire into the crystal until said plate is against the crystal and utilizing material displaced by the heated wire combined with the adhesive coating on the wire and plate to form a cement to secure the wire to the crystal.

10. The method of securing a wire to a synthetic crystal comprising coating the wire with a rubber-phenol formaldehyde resin-acetone material, heating the wire to a temperature sufficient to melt its way into the crystal, thrusting the heated wire into the crystal and allowing material displaced from the crystal by the heated wire to combine with the rubber-phenol formaldehyde resin-acetone material to form a cement to secure the wire in place in the crystal.

11. The method of securing a wire to a synthetic crystal comprising securing an apertured plate on the wire and so that the wire extends through the apertured plate, coating the wire and said apertured plate with a rubber-phenol formaledhyde resin-acetone material, heating the crystal to a temperature almost sufficient to melt the crystal material, heating the wire to a temperature sufficient to melt the crystal material, thrusting the heated wire into the heated crystal until the apertured plate is against the crystal and allowing material displaced from the crystal by the heated wire to combine with the rubber-phenol formaldehyde resin-acetone material to cement the wire and the apertured plate to the crystal.

12. The method of securing a plurality of wires to a synthetic crystal comprising preheating the crystal to a temperature almost sufficient to melt the crystal, heating the wires to a temperature sufficient to melt the crystal material, simultaneously thrusting the heated wires into the heated crystal and allowing the wires and crystal to cool so that material of the crystal displaced by the heated wires will set up and anchor the wires in the crystal.

13. An electro-transducer element comprising a body of electro-transducing material, electrode means on at least one planar surface portion of said body, and a lead comprising a conductor fused into said body at an angle to the plane of said electrode means and in electrical contact with said electrode means.

ARTHUR W. ZIEGLER.

References Cited in the file of this patent

UNITED STATES PATENTS

| Number | Name | Date |
|---|---|---|
| 1,648,256 | Bienenstein | Nov. 8, 1927 |
| 1,746,788 | Marrison | Feb. 11, 1930 |
| 1,766,042 | Nicolson | June 24, 1930 |
| 2,077,204 | Bechmann | Apr. 13, 1937 |
| 2,194,418 | Bowie | Mar. 19, 1940 |
| 2,275,122 | Ziegler | Mar. 3, 1942 |
| 2,453,435 | Havstad | Nov. 9, 1948 |
| 2,474,241 | Garrison | June 28, 1949 |